(12) United States Patent
Cervera et al.

(10) Patent No.: US 7,132,198 B2
(45) Date of Patent: Nov. 7, 2006

(54) BATTERY

(75) Inventors: James J. Cervera, Sandy Hook, CT (US); Christopher Haines, Westford, MA (US); Shuming Zeng, Brookfield, CT (US)

(73) Assignee: The Gillette Company, Boston, MA (US)

( * ) Notice: Subject to any disclaimer, the term of this patent is extended or adjusted under 35 U.S.C. 154(b) by 0 days.

(21) Appl. No.: 11/076,182

(22) Filed: Mar. 8, 2005

(65) Prior Publication Data

US 2005/0158627 A1   Jul. 21, 2005

Related U.S. Application Data

(63) Continuation of application No. 09/902,884, filed on Jul. 11, 2001.

(51) Int. Cl.
*H01M 4/62* (2006.01)
*H01M 4/50* (2006.01)

(52) U.S. Cl. .................................. 429/232; 429/224

(58) Field of Classification Search ................ 429/224, 429/232, 231.8
See application file for complete search history.

(56) References Cited

U.S. PATENT DOCUMENTS

| | | | |
|---|---|---|---|
| 1,137,373 A | 4/1915 | Aylsworth | |
| 3,024,092 A | 3/1962 | Gessler | |
| 3,323,869 A | 6/1967 | Olstowski | |
| 3,903,219 A | 9/1975 | Stephanoff | |
| 4,079,174 A | 3/1978 | Beck et al. | |
| 4,096,318 A | 6/1978 | Wurmb et al. | |
| 4,176,447 A | 12/1979 | Brennan | |
| 4,220,694 A * | 9/1980 | Uetani et al. | 429/172 |
| 4,281,046 A | 7/1981 | Davis, Jr. | |
| 4,320,184 A | 3/1982 | Bernstein et al. | |
| 4,320,185 A | 3/1982 | Bernstein et al. | |
| 4,465,743 A | 8/1984 | Skarstad et al. | |
| 4,499,160 A | 2/1985 | Babai et al. | |
| 4,777,083 A | 10/1988 | Ono et al. | |
| 4,925,747 A | 5/1990 | Kordesch et al. | |
| 4,925,752 A | 5/1990 | Fauteux et al. | |
| 5,069,988 A | 12/1991 | Tomantschger et al. | |
| 5,162,169 A | 11/1992 | Tomantschger et al. | |
| 5,186,919 A | 2/1993 | Bunnell | |
| 5,246,897 A | 9/1993 | Ono et al. | |
| 5,294,300 A | 3/1994 | Kusuyama | |
| 5,358,802 A | 10/1994 | Mayer et al. | |
| 5,426,006 A | 6/1995 | Delnick et al. | |
| 5,478,672 A | 12/1995 | Mitate | |
| 5,482,798 A | 1/1996 | Mototani et al. | |
| 5,698,088 A | 12/1997 | Kang et al. | |

(Continued)

FOREIGN PATENT DOCUMENTS

EP   5-290844   5/1993

(Continued)

OTHER PUBLICATIONS

Flandrois et al., "Carbon materials for lithium-ion rechargeable batteries", Carbon, vol. 37, pp. 165-180, 1999.

(Continued)

*Primary Examiner*—Jonathan Crepeau
(74) *Attorney, Agent, or Firm*—Fish & Richardson P.C.

(57) ABSTRACT

A primary alkaline battery includes a cathode having manganese dioxide and carbon particles, an anode, a separator and an alkaline electrolyte. The carbon particles include expanded graphite particles and non-expanded graphite particles. The expanded graphite particles have a kerosene absorption greater than about 2.7 milliliters per gram.

10 Claims, 1 Drawing Sheet

U.S. PATENT DOCUMENTS

| | | | |
|---|---|---|---|
| 5,744,266 A * | 4/1998 | Nunome et al. ............ 429/224 |
| 5,776,372 A | 7/1998 | Saito et al. | |
| 5,846,459 A | 12/1998 | Mercuri | |
| 5,919,589 A | 7/1999 | Kawakami et al. | |
| 5,981,072 A | 11/1999 | Mercuri et al. | |
| 5,985,452 A | 11/1999 | Mercuri | |
| 6,017,633 A | 1/2000 | Mercuri | |
| 6,024,900 A | 2/2000 | Saito et al. | |
| 6,451,486 B1 | 9/2002 | Davis et al. | |
| 2001/0033822 A1 | 10/2001 | Ishii et al. | |
| 2001/0041293 A1 | 11/2001 | Barsukov et al. | |

FOREIGN PATENT DOCUMENTS

| | | | |
|---|---|---|---|
| EP | 0 579 879 A1 | | 1/1994 |
| EP | 0 646 976 A1 | | 4/1995 |
| EP | 0 675 556 A1 | | 10/1995 |
| JP | 58-189963 | | 11/1983 |
| JP | 59-78451 | | 5/1984 |
| JP | 9-7601 | | 10/1997 |
| JP | 10-284056 | * | 10/1998 |
| JP | 11-149927 | | 2/1999 |
| WO | WO 91/17581 | | 11/1991 |
| WO | WO 93/08123 | | 4/1993 |
| WO | WO 99/34462 | | 7/1999 |
| WO | WO 99/34673 | | 7/1999 |
| WO | WO 99/46437 | | 9/1999 |
| WO | WO 01/84652 | | 11/2001 |

OTHER PUBLICATIONS

Kosteck et al., "Raman Spectroscopy and Electron Microscopy of Heat-Treated Petroleum Cokes for Lithium-Intercalation Electrodes", J. Electrochem. Soc., vol. 144, No. 9, pp. 3111-3117, Sep. 1997.

Spoor et al., "Generation of (Ultra) Fine Carbonaceous Particle Aerosols", J. Aerosal Sci., vol. 27, Suppl. 1, pp. 5397-5398, Sep. 1996.

Herold et al., "Exfoliation of Graphite Intercalation Compounds: Classification and Discussion of the Process from New Experimental Data Relative to Graphite-Acid Compounds", Materials Science Forum vols. 152-153, pp. 281-288, 1994.

Davis, S. et al., "Graphite as a Pycnometric Fluid for Measuring the Density of Porous Powders," *Progress in Batteries & Solar Cells*, vol. 7, 342-348 (1988).

* cited by examiner

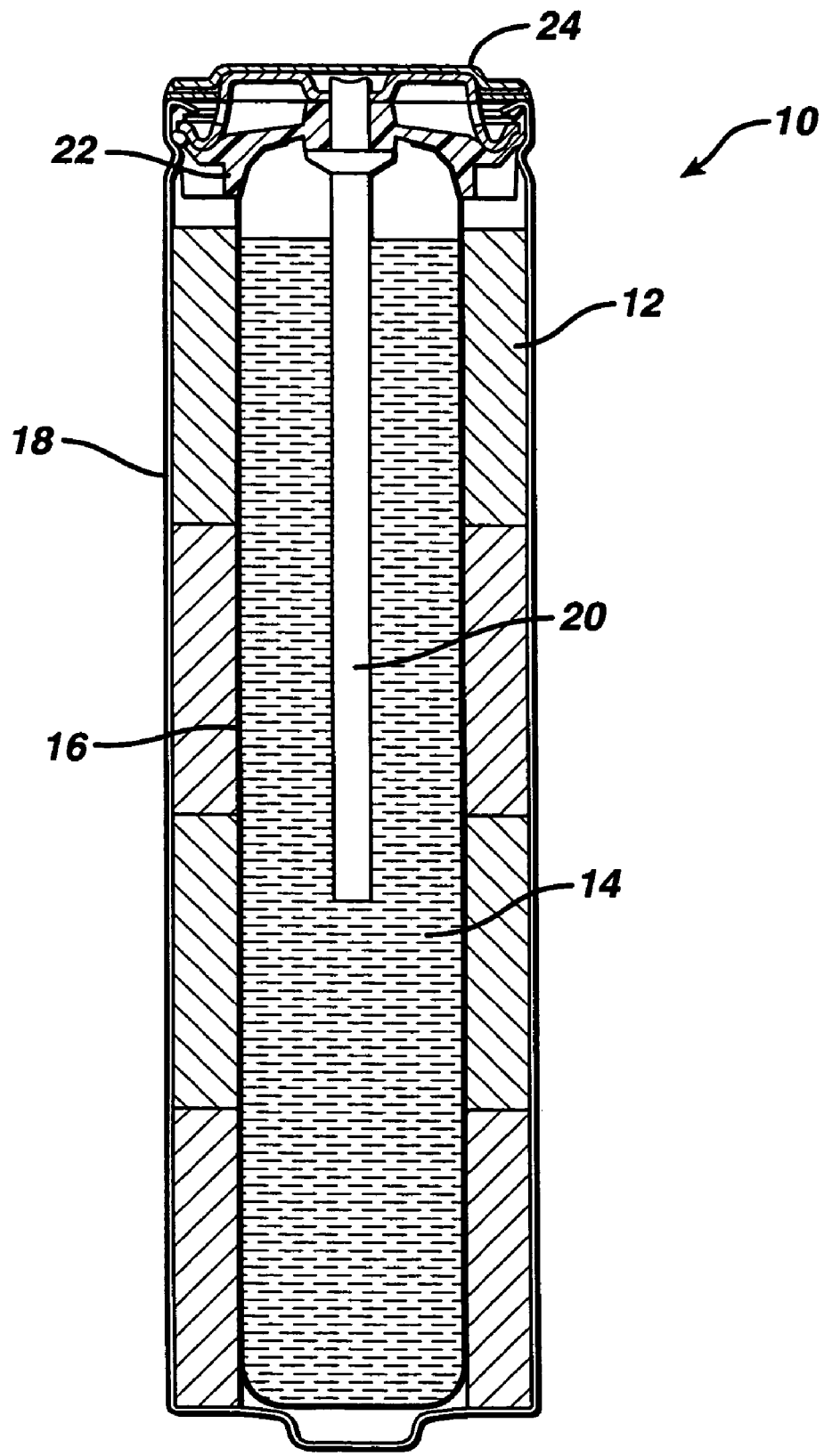

BATTERY

CROSS-REFERENCE TO RELATED APPLICATIONS

This application is a continuation of, and claims the benefit of priority under 35 U.S.C. § 120 to, U.S. patent application Ser. No. 09/902,884, filed on Jul. 11, 2001, and entitled "Battery", which is incorporated herein by reference in its entirety.

TECHNICAL FIELD

This invention relates to batteries.

BACKGROUND

Batteries, such as primary alkaline batteries, are commonly used as energy sources. Generally, alkaline batteries include a cathode, an anode, a separator, and an electrolytic solution. The cathode can include, for example, manganese dioxide particles as the active material, carbon particles that enhance the conductivity of the cathode, and a binder. The anode may be, for example, a gel including zinc particles as the active material. The separator is disposed between the cathode and the anode. The electrolytic solution can be, for example, a hydroxide solution that is dispersed throughout the battery.

It is desirable for a primary alkaline battery to have a high discharge capacity. One factor that affects the discharge capacity is the quantity of manganese dioxide in the cathode. As a general rule, the more manganese dioxide in the cathode, the higher the discharge capacity of the battery. But the cathode must also include a sufficient quantity of carbon particles for adequate conductivity. Thus, the quantity of manganese dioxide that can be included in the cathode is limited in part by the quantity of carbon particles required for adequate conductivity.

Typically, the carbon particles used in cathode are composed of graphite. It is known to use a specific type of graphite known as expanded graphite in place of normal graphite particles in the cathode. Expanded graphite is a flake graphite that is chemically treated and heated at a high temperature resulting in the exfoliation of the graphite particles. This produces a graphite with a significantly higher surface area thereby providing better contact with the manganese dioxide particles in the cathode. As a result, a quantity of expanded graphite particles provides a higher degree of conductivity to the cathode than the same quantity of non-expanded graphite particles. This in turn means that less graphite and more manganese dioxide can be included in the cathode, thus increasing the discharge capacity of the battery.

SUMMARY

The invention relates to using expanded graphite particles in the cathode of primary alkaline batteries. The expanded graphite particles provide the cathode with enhanced conductivity in comparison to, for example, a cathode including only non-expanded graphite particles (in the same total quantity). The invention also relates to using blends of expanded and non-expanded graphite particles in the cathode of primary alkaline batteries. Because expanded graphite can be more expensive than natural graphite, the cost of the graphite used in the battery is reduced as compared with cathodes including only expanded graphite. The cathodes can be relatively lubricious and easy to process.

In one aspect, the invention features a primary alkaline battery including a cathode having manganese dioxide and carbon particles having expanded graphite particles and non-expanded graphite particles, the expanded graphite particles having a kerosene absorption greater than about 2.5 mL/g, e.g., >about 2.6 mL/g, >about 2.7 mL/g, >about 3.0 mL/g,>about 3.5 mL/g, >about 4.0 mL/g, or >about 5.0 mL/g, an anode, a separator and an alkaline electrolyte.

In another aspect, the invention features a primary alkaline battery including a cathode having manganese dioxide and carbon particles having expanded graphite particles and non-expanded graphite particles, the expanded graphite particles having a BET surface area greater than about 5 $m^2/g$, e.g., >about 10 $m^2/g$ or >about 20 $m^2/g$, an anode, a separator and an alkaline electrolyte.

In another aspect, the invention features a primary alkaline battery including a cathode having manganese dioxide and carbon particles having expanded graphite particles and non-expanded graphite particles, the expanded graphite particles having a Scott apparent density less than about 0.08 g/mL, e.g., <about 0.07 g/mL, an anode, a separator and an alkaline electrolyte.

In another aspect, the invention features a primary alkaline battery including a cathode having manganese dioxide and carbon particles having expanded graphite particles and non-expanded graphite particles, the expanded graphite particles having a $D_{50}$ particle size greater than about 35 microns, e.g., between about 35 and about 100 microns or between about 40 and about 50 microns, an anode, a separator and an alkaline electrolyte.

In another aspect, the invention features a primary alkaline battery having a cathode that includes manganese dioxide and expanded graphite particles having a kerosene absorption greater than about 4.4 milliliters per gram, an anode, a separator and an alkaline electrolyte. For example, the graphite particles can have a kerosene absorption between about 5 and about 6 milliliters per gram, e.g., between about 5.2 and about 5.6 milliliters per gram, or about 5.4 milliliters per gram.

In another aspect, the invention features a primary alkaline battery having a cathode that includes manganese dioxide and expanded graphite particles having a total pore volume greater than about 0.1 milliliter per gram, an anode, a separator, and an alkaline electrolyte. For example, the expanded graphite particles can have a total pore volume greater than about 0.15 milliliter per gram, e.g., greater than about 0.2 milliliter per gram.

The cathode can include, e.g., between about 2% and about 10%, e.g., between about 3% and about 6%, of expanded graphite particles by weight.

The cathode can include, e.g., between about 80% and about 95%, e.g., between about 85% and about 90%, of manganese dioxide by weight.

In some embodiments, the cathode can include, e.g., between about 75% and 25% of expanded graphite particles by weight and between about 25% and 75% of non-expanded graphite particles by weight, e.g., about 60% and 40% of expanded graphite particles by weight and between about 40% and 60% of non-expanded graphite particles by weight.

The non-expanded graphite particles can have, for example, a particle size of less than about 40 microns, preferably between about 2 microns and about 12 microns, and more preferably between about 5 microns and about 9 microns. The expanded graphite particles and non-expanded graphite particles can be natural or synthetic.

Other features and advantages of the invention will be apparent from the description of the preferred embodiments thereof and from the claims.

DESCRIPTION OF DRAWING

The FIGURE is a cross-section view of a battery.

DETAILED DESCRIPTION

Referring to the FIGURE, battery 10 includes a cathode 12, an anode 14, a separator 16 and a cylindrical housing 18. Battery 10 also includes current collector 20, seal 22, and a negative metal top cap 24, which serves as the negative terminal for the battery. The cathode is in contact with the housing, and the positive terminal of the battery is at the opposite end of the battery from the negative terminal. An electrolytic solution is dispersed throughout battery 10. Battery 10 can be, for example, an AA, AAA, AAAA, C, or D battery.

Cathode 12 includes manganese dioxide, graphite particles, and a binder.

Any of the conventional forms of manganese dioxide used for cathodes can be used. For example, the manganese dioxide can be EMD or CMD. A preferred manganese dioxide is described in U.S. Ser. No. 09/562,828, filed May 1, 2000 now U.S. Pat. No. 6,440,181, hereby incorporated by reference. Distributors of manganese dioxides include Kerr McGee, Co. (Trona D), Chem Metals, Co., Tosoh, Delta Manganese, Mitsui Chemicals and JMC. Generally the cathode may include, for example, between about 80% and about 95%, and preferably between about 85% and about 90%, of manganese dioxide by weight.

The carbon particles include expanded graphite particles. The graphite particles can be synthetic or non-synthetic (natural), or a blend of synthetic and non-synthetic. Table I shows examples of expanded graphite particles (DCN-2, available from Chuetsu Graphite Works Ltd., Japan; A2-21, A2-60 and A2-61A, all available from Nacional de Grafite (Itapecerica, MG Brazil); and BNB90, available from Timcal AG, Sins, Switzerland) and an example of non-expanded graphite particles (MP-0702X, available from Nacional de Grafite). The cathode may include for example, between about 2% and about 10%, preferably between about 3% and about 6% graphite particles by weight.

For purposes of this application, kerosene absorption can be determined according to procedures described in, for example, WO 99/34673, hereby incorporated by reference. For example, a solution of 96% kerosene and 4% Acqard 2C 75% cationic oil by volume is added to about 10 grams of graphite powder until no free powder can be seen.

In addition, or alternatively, the expanded graphite particles preferably have a total pore volume greater than about 0.10 mL/g, e.g., greater than about 0.15 mL/g or greater than about 0.20 mL/g. For purposes of this application, total pore volume is determined by gas porosimetry in which graphite powder is outgassed under vacuum at about 150° C. for about 7 hours in a Quantchrome Autosorb 6 instrument. Total pore volume is determined from the nitrogen gas adsorption/desorption isotherm and calculated using software provided by Quantchrome.

In addition, or alternatively, the expanded graphite particles preferably have a BET surface area greater than about 5 $m^2/g$, e.g., between about 5 and about 25 $m^2/g$. For purposes of this application, BET surface area is determined by the same procedures described above for total pore volume, except that BET surface area is calculated from a nitrogen gas adsorbate and a multi-point BET equation.

In addition, or alternatively, the expanded graphite particles preferably have an average particle size ($D_{50}$) of greater than about 35 microns, more preferably between about 35 microns and about 100 microns, and most preferably between about 40 microns and about 50 microns. For purposes of this application, particle size is measured using a Sympatec HELOS analyzer.

The expanded graphite particles preferably have a Scott Apparent Density less than about 0.08 g/mL. Density is determined according to ASTM B 212-76 in which a graphite powder sample is passed through a flowmeter apparatus, collected in a one-inch cubical density cup (Scott Volumeter), and weighed to obtain the density of the graphite.

In some embodiments, the carbon particles in cathode 12 are a blend of expanded graphite particles as described above and non-expanded graphite particles. The non-expanded graphite particles can be synthetic or non-synthetic (natural), or a blend of synthetic and non-synthetic.

The non-expanded graphite particles preferably have an average particle size of less than about 40 microns, e.g., less than about 20 microns, more preferably from about 2 microns to about 12 microns, and most preferably from about 5 microns to about 9 microns. Non-synthetic, non-

TABLE I

| Sample | Graphite | Kerosene Absorption (mL/g) | BET Surface Area ($m^2/g$) | Total Pore Volume (mL/g) | Scott Density (g/cc) | Particle Size (μm) | | | Pellet Resistance[a] (Ohm · cm) |
|--------|----------|---------------------------|---------------------------|--------------------------|----------------------|--------------------|-------|------|-------------------------------|
|        |          |                           |                           |                          |                      | $D_{10}$ | $D_{50}$ | $D_{90}$ |                           |
| A | MP-0702X | 1.2 | 8.1 | 0.087 | 0.160 | 2.8 | 7.2 | 14.6 | 1.01 |
| B | DCN-2 | 2.6 | 20.7 | 0.183 | 0.070 | 5.4 | 19.2 | 55.6 | 0.180 |
| C | A2-21 | 3.8 | 5.0 | 0.106 | 0.076 | 25.1 | 101.0 | 233 | 0.058 |
| D | A2-60 | 3.6 | 12.3 | 0.567 | 0.079 | 29.4 | 97.2 | 194 | 0.058 |
| E | A2-61A | 3.8 | 13.9 | 0.235 | 0.070 | 12.2 | 50.2 | 115 | 0.065 |
| F | BNB90 | 5.4 | 24.3 | 0.217 | 0.056 | 12.1 | 40.1 | 107 | 0.085 |

The expanded graphite particles preferably have a kerosene absorption greater than about 3.5 mL/g, e.g., greater than about 4.4 mL/g, between about 5 and about 6 mL/g, between about 5.2 and about 5.6 mL/g, or about 5.4 mL/g.

expanded graphite particles can be obtained from, for example, Nacional de Grafite (MP-0702X).

Generally, between 25% and 75%, or 35% and 65%, or 40% and 60%, or 45% and 55% of the carbon particles are non-expanded graphite particles, with the remainder being the expanded graphite particles.

Examples of binders include polyethylene powders, polyacrylamides, Portland cement and fluorocarbon resins, such as PVDF and PTFE. An example of polyethylene binder is sold under the tradename Coathylene HA-1681 (available from Hoescht). The cathode may include, for example, between 0.1 percent to about 1 percent of binder by weight.

Cathode 12 can include other additives. Examples of these additives are disclosed, for example, in U.S. Pat. No. 5,342,712, which is hereby incorporated by reference. Cathode 12 may include, for example, from about 0.2 weight percent to about 2 weight percent $TiO_2$.

The electrolyte solution also is dispersed through cathode 12, and the weight percentages provided above and below are determined after the electrolyte solution has been dispersed.

Anode 14 can be formed of any of the standard zinc materials used in battery anodes. For example, anode 14 can be a zinc slurry that includes zinc metal particles, a gelling agent, and minor amounts of additives, such as gassing inhibitor. In addition, a portion of the electrolyte solution is dispersed throughout the anode.

The zinc particles can be any of the zinc particles conventionally used in slurry anodes. Examples of zinc particles include those described in U.S. Ser. No. 08/905,254 now U.S. Pat. No. 6,284,410, U.S. Ser. No. 09/115,867, now abandoned and U.S. Ser. No. 09/156,915, now U.S. Pat. No. 6,284,410 which are assigned to the assignee in the present application and are hereby incorporated by reference. The anode may include, for example, between 67% and 71% of zinc particles by weight.

Examples of gelling agents include polyacrylic acids, grafted starch materials, salts of polyacrylic acids, polyacrylates, carboxymethylcellulose, sodium carboxymethylcellulose or combinations thereof. Examples of such polyacrylic acids are Carbopol 940 and 934 (available from B.F. Goodrich) and Polygel 4P (available from 3V), and an example of a grafted starch material is Waterlock A221 (available from Grain Processing Corporation, Muscatine, Iowa). An example of a salt of a polyacrylic acid is Alcosorb G1 (available from Ciba Specialties). The anode may include, for example, from 0.1 percent to about 2 percent gelling agent by weight.

Gassing inhibitors can be inorganic materials, such as bismuth, tin, lead and indium. Alternatively, gassing inhibitors can be organic compounds, such as phosphate esters, ionic surfactants or nonionic surfactants. Examples of ionic surfactants are disclosed in, for example, U.S. Pat. No. 4,777,100, which is hereby incorporated by reference.

Separator 16 can have any of the conventional designs for battery separators. In some embodiments, separator 16 can be formed of two layers of non-woven, non-membrane material with one layer being disposed along a surface of the other. To minimize the volume of separator 16 while providing an efficient battery, each layer of non-woven, non-membrane material an have a basic weight of about 54 grams per square meter, a thickness of about 5.4 mils when dry and a thickness of about 10 mils when wet. In these embodiments, the separator preferably does not include a layer of membrane material or a layer of adhesive between the non-woven, non-membrane layers. Generally, the layers can be substantially devoid of fillers, such as inorganic particles.

In other embodiments, separator 16 includes a layer of cellophane combined with a layer of non-woven material. The separator also includes an additional layer of non-woven material. The cellophane layer can be adjacent cathode 12 or the anode. Preferably, the non-woven material contains from about 78 weight percent to about 82 weight percent PVA and from about 18 weight percent to about 22 weight percent rayon with a trace of surfactant. Such non-woven materials are available from PDM under the tradename PA25.

The electrolytic solution dispersed throughout battery 10 can be any of the conventional electrolytic solutions used in batteries. Typically, the electrolytic solution is an aqueous hydroxide solution. Such aqueous hydroxide solutions include potassium hydroxide solutions including, for example, between 33% and 38% by weight percent potassium hydroxide, and sodium hydroxide solutions.

Housing 18 can be any conventional housing commonly used in primary alkaline batteries. The housing typically includes an inner metal wall and an outer electrically non-conductive material such as heat shrinkable plastic. Optionally, a layer of conductive material can be disposed between the inner wall and the cathode 12. This layer may be disposed along the inner surface of wall, along the circumference of cathode 12 or both. This conductive layer can be formed, for example, of a carbonaceous material. Such materials include LB1000 (Timcal), Eccocoat 257 (W. R. Grace & Co.), Electrodag 109 (Acheson Colloids Company), Electrodag 112 (Acheson) and EB0005 (Acheson). Methods of applying the conductive layer are disclosed in, for example, Canadian Patent No. 1,263,697, which is hereby incorporated by reference.

Current collector 28 is made from a suitable metal, such as brass. Seal 30 can be made, for example, of nylon.

Referring to Table II, samples of battery 10 (AA) were prepared according to the following procedures.

For Sample G, the cathode included about 9.2 to 9.8 grams of manganese dioxide (Kerr-McGee, Co.), 0.5 to 0.6 grams (5.3% by weight) of a 1:1 blend of MP-0702X non-expanded graphite (Nacional de Grafite) and A2-60 expanded graphite (Nacional de Grafite), about 0.7 to 0.8 g of 9N KOH solution, and about 0.1 to 0.5 weight percent of coathylene HA-1681. The porosity of the cathode was about 24%.

The anode included about 4 grams of zinc particles, about 50 ppm surfactant (RM 510, Rhone Poulenc) relative to zinc, about 2 grams of 9N KOH (with 2% dissolved ZnO), and about 0.1 weight percent total gelling agent (Carbopol 940 and A221). The density of the anode was about 68%. The separator was formed of two layers of non-woven, non-membrane material with one layer being disposed along a surface of the other. To minimize the volume of separator, each layer of non-woven, non-membrane material had a basic weight of about 54 grams per square meter, a thickness of about 5.4 mils when dry and a thickness of about 10 mils when wet. A thin coating of EB005 (Acheson) was disposed between the outer wall of the battery and the outer periphery of the cathode.

Identical AA batteries were prepared, except that in Sample H, the cathode included a 1:1 blend of MP-0702X non-expanded graphite and A2-61A expanded graphite; and in Sample I, the cathode included a 1:1 blend of MP-0702X non-expanded graphite and BNB90 expanded graphite.

TABLE II

| | | Performance Difference In High Drain Tests (vs. 1:1 blend of Samples A & B) | | | | | | | |
|---|---|---|---|---|---|---|---|---|---|
| Sample | Blend (1:1) | Camcorder[1] | Digital Phone[2] | Digital Camera[3] | IEC Photo[4] | HHPC[5] | HHPC[6] | HHTV[7] | HIF[8] |
| G | A & D | +5.0% | +1.8% | +10% | +2.9% | −3.6% | −2.4% | −1.6% | −3.5% |
| H | A & E | +5.2% | +7.6% | +9.3% | +4.8% | +6.0% | +3.1% | +1.1% | +4.3% |
| I | A & F | +2.9% | +10% | +7% | +1.5% | +3.5% | +6.2% | +1.0% | +0.1% |

[1]Service hour at 0.9 V
[2]Service hour at 1.0 V
[3]Pulse count at 1.0 V
[4]Pulse count at 0.9 V
[5]Service hour at 1.1 V
[6]Service hour at 1.0 V
[7]Service hour at 0.9 V
[8]Service hour at 0.8 V The test batteries were stored at a temperature of about 55° C. for two weeks. The batteries were then tested according to the following procedures.

In the "Camcorder" test, the batteries were discharged at a pulse discharge of 1 Watt, 5 min on/55 min off.

In the "Digital Phone" test, the batteries were discharged at a pulse discharge of 1.42-Amp/0.55 ms-0.135 A/4.05 ms, 2 min on/15 min off.

In the "Digital Camera" test, the batteries were discharged at a pulse discharge of 1-Amps 10 sec/min 1 hr/day.

In the "IEC Photo" test, the batteries were discharged at a pulse discharge of 1-Amps 10 sec/min 1 hr/day.

In the "HHPC" (hand held PC) test, the batteries were discharged at a pulse discharge of 1-Watt 3 sec/7 sec.

In the "HHTV" (hand held TV) test, the batteries were discharged at a pulse discharge of 0.5-Amps 30 min/day.

In the "HIF" (high intensity flashlight) test, the batteries were discharged at a pulse discharge of 3.9-Ohm 1 hr/day.

Table II shows the performances of Samples G, H and I relative to a sample having 1:1 blend of MP-0702X non-expanded graphite and DCN-2, an example of expanded graphite particles having a kerosene absorption of 2.6 mL/g.

Other embodiments are within the claims.

The invention claimed is:

1. A primary alkaline battery, comprising:
   a cathode comprising
      between about 85% and about 90% of manganese dioxide by weight and
      expanded graphite particles having a total pore volume greater than about 0.1 milliliter per gram;
   an anode;
   a separator; and
   an alkaline electrolyte.

2. The battery of claim 1, wherein the expanded graphite particles have a total pore volume greater than about 0.15 milliliter per gram.

3. The battery of claim 1, wherein the expanded graphite particles have a total pore volume greater than about 0.2 milliliter per gram.

4. The battery of claim 1, wherein the cathode comprises between about 2% and about 10% of expanded graphite particles by weight.

5. The battery of claim 1, wherein the cathode comprises between about 3% and about 6% of expanded graphite particles by weight.

6. The battery of claim 1, wherein the cathode further comprises non-expanded graphite particles.

7. The battery of claim 6, wherein the carbon particles comprise between about 75% and 25% of expanded graphite particles by weight and between about 25% and 75% of non-expanded graphite particles by weight.

8. The battery of claim 6, wherein the carbon particles comprise between about 60% and 40% of expanded graphite particles by weight and between about 40% and 60% of non-expanded graphite particles by weight.

9. The battery of claim 6, wherein the non-expanded graphite particles have an average particle size of less than about 40 microns.

10. The battery of claim 1, wherein the anode comprises zinc.

* * * * *